United States Patent [19]
Adams et al.

[11] 3,821,293
[45] June 28, 1974

[54] 2-(4'-CHLORO-4-BIPHENYLYL)PROPIONIC ACID

[75] Inventors: Stewart Sanders Adams; Bernard John Armitage; John Stuart Nicholson, all of Nottingham, England; Antonio Ribera Blancafort, Madrid, Spain

[73] Assignee: The Boots Company Limited, Nottingham, England

[22] Filed: Dec. 15, 1969

[21] Appl. No.: 885,280

Related U.S. Application Data

[63] Continuation-in-part of Ser. No. 425,624, Jan. 14, 1965, abandoned.

[52] U.S. Cl........ 260/515 A, 260/469, 260/475 SC, 260/592, 424/317
[51] Int. Cl............................................. C07c 63/00
[58] Field of Search............................... 260/515 A

[56] References Cited
UNITED STATES PATENTS
3,624,142   11/1971   Shen et al.......................... 260/515

*Primary Examiner*—James A. Patten
*Attorney, Agent, or Firm*—Gordon W. Hueschen

[57] ABSTRACT

2-(4'-Chloro-4-biphenylyl)propionic acid possessing valuable anti-inflammatory activity. It also exhibits analgesic and antipyretic properties.

1 Claim, No Drawings

2-(4'-CHLORO-4-BIPHENYLYL)PROPIONIC ACID

This application is a continuation-in-part of Ser. No. 425,624, filed Jan. 14th 1965, now abandoned, in which application the presently claimed compound appeared in Example 1, page 13, line 9 and in the specification at line 20, page 3.

The invention provides the novel compound 2-(4'-chloro-4-biphenylyl)propionic acid.

This compound possesses anti-inflammatory acitivity and is useful for the treatment of inflammatory conditions. It also possesses analgesic and antipyretic properties and is useful for the treatment of conditions of pain and pyretic conditions. It is useful for the treatment of these three conditions individually or in any combination. A particularly notable feature of the compound is its long lasting effect, which allows a relatively constant blood level to be achieved throughout a 24 hour period, in contrast to short-acting compounds e.g. 2-(4-isobutylphenyl)-propionic acid where there are wide fluctuations in blood levels over 24 hours.

The compound may conveniently be prepared by reacting an ester of 4'-chloro-4-biphenylylacetic acid with diethyl carbonate to give a malonic acid ester, methylating the sodium derivative of this ester, hydrolysing the ester, and decarboxylating the resulting acid, viz.

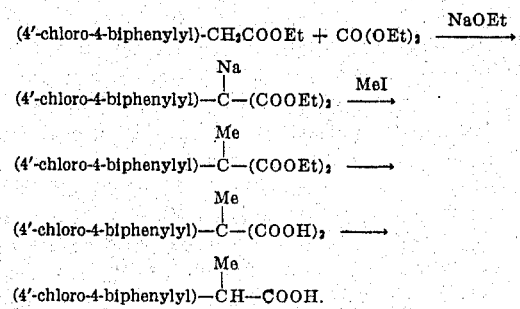

The activity of the compound of the invention has been determined in experimental animals using pharmacological tests which are known to be capable of characterising compounds possessing the therapeutic properties of aspirin, namely anti-inflammatory, analgesic and antipyretic activity; its long lasting effect has been confirmed by blood level experiments.

The compound of the invention may be administered in the conventional manner of aspirin or usual manner for other antiinflammatory, analgesic, and antipyretic agents, for example orally, topically, rectally or parenterally, preferably orally. The optimum dosage rate varies with the route of administration, but normally lies within the range 0.014–14.0 mg./kg., more usually between 0.35–7.0 mg./kg. The unit dose may vary from 1 mg. to 1000 mg. per subject per day; for oral administration the dosage rate is preferably 25–500 mg. per subject per day, optionally in divided doses.

In use, the compound of the invention is administered in conventional formulations and accordingly the invention also provides therapeutic compositions which comprise the compound of the invention in association with pharmaceutical excipients for the production of compositions for oral, topical, rectal or parenteral administration. These compositions preferably contain 0.1–90 percent by weight of the compound of the invention.

Compositions for oral administration are the preferred compositions of the invention, and these are the conventional pharmaceutical forms for such administration, such as for example tablets, capsules, lozenges, powders, effervescent granules, syrups and aqueous and oily suspensions. The excipients used in the preparation of these compositions are the excipients of the pharmacist's art. Thus in the preparation of tablets, typical excipients include disintegrating agents, e.g., maize starch and lubricating agents, e.g., magnesium stearate; in the preparation of capsules, standard gelation capsules may be used containing the active ingredient alone or admixed with a diluent. The liquid compositions may comprise as excipients water and sucrose to provide syrups, water, dispersing agents and suspending agents, e.g., sodium carboxymethylcellulose to provide aqueous suspensions, and a non-toxic oil, e.g., a vegetable oil such as arachis oil and a suspending agent to provide oily suspensions.

Compositions for rectal administration are the conventional pharmaceutical forms for such administration, such as for example suppositories with cocoa butter or polyethylene glycol bases.

Compositions for topical use are the conventional pharmaceutical forms for such application, such as ointments, creams and lotions. Ointments and creams may be water miscible or water-immiscible in character and include emulsions prepared from emulsifying waxes and oils and those prepared from water miscible polyethylene glycols. Lotions may comprise a solution in an aliphatic alcohol with 1–4 carbon atoms which may contain a small proportion of water.

Compositions for parenteral administration are the conventional pharmaceutical forms for such administration, for example sterile suspensions in aqueous or oily media or sterile solutions in propylene glycol.

In some formulations it may be beneficial to use the compound of the invention in the form of particles of very small size, such as for example, as obtained by fluid energy milling, e.g., micronizing.

The invention further provides a method of treating inflammatory conditions, conditions of pain and pyretic conditions, individually or in any combination, which comprises administering the compound of the invention, preferably orally. Salts, esters, amides and alcohols derived from the compound of the invention may be used in place of the compound of the invention as such derivatives appear to be metabolised by the animal body and be converted in the body into the corresponding acid.

The product of the present invention may of course be employed in combination with other active anti-inflammatory agents, analgesics, and antipyretic agents, or with other drugs, as is already conventional in the art for other existing anti-inflammatory, analgesic and antipyretic materials such as aspirin.

The following non-limitative examples illustrate the invention.

EXAMPLE 1

Aluminium chloride (14.5 g.) in nitrobenzene (60 ml.) at 10°C. was treated with acetyl chloride (9 ml.)

and 4-chlorobiphenyl (17.69 g.) with stirring. After 5 hours the mixture was decomposed with ice and hydrochloric acid. Nitrobenzen was steam distilled and the crystalline residue was collected, washed and recrystallised from ethanol to give 4-acetyl-4'-chlorobiphenyl m.p. 96° – 103°C.

This ketone (17.87 g.), sulphur (4 g.) and morpholine (23 ml.) were refluxed for 7 hours, diluted with ethanol (25 ml.) and the thiomorpholide which separated was collected and washed with ethanol (50 ml.). It was hydrolysed by refluxing with 70 percent ehtanol (140 ml.) and 50 percent sodium hydroxide solution for 8 hours. The alcohol was distilled, the residue was diluted with hot water, charcoaled, filtered and acidified with dilute hydrochloric acid. The solid which separated was collected, washed and recrystallised from ethyl acetate to give 4'-chloro-4-biphenylylacetic acid m.p. 158° – 161°C.

(Found: C, 68.15; H, 3.95. $C_{14}H_{11}ClO_2$ requires C, 68.1; H, 4.5%).

4'-Chloro-4-biphenylylacetic acid, (180 g.) was refluxed overnight with ethanol (500 ml.) and concentrated sulphuric acid (50 ml.). The alcohol was distilled and the residue was diluted with water. The ester which separated was collected and recrystallised from light petroleum (b.p. 40° – 60°C.) to give ethyl 4'-chloro-4-biphenylylacetate m.p. 65°C.

(Found: C, 69.8; H, 5.7; Cl, 12.9. $C_{16}H_{15}ClO_2$ requires C, 69.9; H, 5.5; Cl, 12.9%).

Sodium ethoxide (from 12.9 g. of sodium) in ethanol (325 ml.) was added at 100°C, with stirring to a solution of ethyl 4'-chloro-4-biphenylylacetate (123 g.), in diethyl carbonate (710 ml.). The mixture was distilled until the still head temperature reached 124°C. and the residue was cooled to 0°C. overnight. It was treated with glacial acetic acid (62 ml.) in water (250 ml.), extracted with ether and the ether extracts were washed with sodium bicarbonate solution, water and then dried. The ether was evaporated and the residue was distilled, to give an oil which solidified on cooling in a solid carbon dioxide/acetone mixture. It was recrystallised from light petroleum (b.p. 40° – 60°C.) to give ethyl 4'-chloro-4-biphenylylmalonate m.p. 47° – 49°C.

(Found: C, 65.5; H, 5.5; Cl, 10.5. $C_{19}H_{19}ClO_4$ requires C, 65.8; H, 5.5; Cl, 10.2%).

Ethyl 4'-chloro-4-biphenylylmalonate (34.7 g.) was added to a stirred solution of sodium ethoxide (from 2.5 g. of sodium) in ethanol (100 ml.) followed by methyl iodide (16.5 ml.). The mixture was refluxed for 2 hours, methyl iodide (10 ml.) was added and the mixture was refluxed for a further hour. The alcohol was distilled and the residue was hydrolysed by refluxing for 5 hours with 2.5N sodium hydroxide solution (200 ml.) in ethanol (100 ml.). The alcohol was distilled, the aqueous residue was acidified, the precipitated malonic acid was collected and decarboxylated at 190°C. for 1 hour. The residue was crystallised from aqueous ethanol to give 2-(4'-chloro-4-biphenylyl)propionic acid m.p. 175° – 176°C.

(Found: C, 69.5; H, 5.1; Cl, 13.8. $C_{15}H_{13}ClO_2$ requires C, 69.2; H, 5.0; Cl, 13.6%).

EXAMPLE 2

Compositions - hard gelatin capsules

No. 5 hard gelatin capsules were prepared each containing the following:

| | | |
|---|---|---|
| (a) | 2-(4'-chloro-4-biphenylyl)propionic acid | 5 mg. |
| | lactose | 95 mg. |
| (b) | 2-(4'-chloro-4-biphenylyl)propionic acid | 5 mg. |
| | calcium phosphate | 5 mg. |
| | maize starch | 90 mg. |
| (c) | 2-(4'-chloro-4-biphenylyl)propionic acid | 5 mg. |
| | maize starch ) | |
| | lactose ) equal parts by | 95 mg. |
| | calcium phosphate ) weight | |

EXAMPLE 3

The following mixture (parts by weight) was formed into tablets in conventional manner, each tablet containing 5 mg. of active ingredient:

| | |
|---|---|
| 2-(4'-chloro-4-biphenylyl)propionic acid | 5 |
| maize starch | 30 |
| lactose | 163 |
| stearic acid | 1 |
| magnesium stearate | 1 |

In a similar manner, 2-(4'-chloro-4-biphenylyl)propionic acid is incorporated into other conventional compositions and formulations, taking various conventional forms, and administered as previously described to give the desirable relief described, depending upon the physiological abnormality or condition being treated.

We claim:

1. 2-(4'-Chloro-4-biphenylyl)propionic acid.

* * * * *